United States Patent
Ahmed

(10) Patent No.: US 9,933,157 B2
(45) Date of Patent: Apr. 3, 2018

(54) TOP PORTED BURNER

(71) Applicant: W.C. Bradley Co., Columbus, GA (US)

(72) Inventor: Mallik Ahmed, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 266 days.

(21) Appl. No.: 14/846,005

(22) Filed: Sep. 4, 2015

(65) Prior Publication Data

US 2016/0069564 A1 Mar. 10, 2016

Related U.S. Application Data

(60) Provisional application No. 62/047,453, filed on Sep. 8, 2014.

(51) Int. Cl.
*F23D 14/10* (2006.01)
*A47J 37/07* (2006.01)

(52) U.S. Cl.
CPC .......... *F23D 14/10* (2013.01); *A47J 37/0713* (2013.01); *F23D 2203/1012* (2013.01); *F23D 2900/00017* (2013.01)

(58) Field of Classification Search
CPC ....................................................... F24C 3/085
USPC ........................ 126/39 E, 41 R; 431/264, 354
See application file for complete search history.

(56) References Cited

U.S. PATENT DOCUMENTS

| | | | |
|---|---|---|---|
| 1,735,629 A * | 11/1929 | Braden | F23D 11/001 |
| | | | 431/265 |
| 4,815,439 A * | 3/1989 | Houck | A47J 37/00 |
| | | | 126/19 R |
| 5,743,727 A | 4/1998 | Rodgers | |
| 6,102,029 A * | 8/2000 | Stephen | A47J 37/0713 |
| | | | 126/41 R |
| 6,461,152 B2 | 10/2002 | Wood et al. | |
| 6,705,307 B2 | 3/2004 | Alden et al. | |
| 8,336,534 B2 | 12/2012 | Irvin | |
| 8,875,693 B2 | 11/2014 | Irvin | |
| 2005/0133018 A1 * | 6/2005 | Spangrud | A47J 37/0781 |
| | | | 126/41 R |
| 2009/0205631 A1 * | 8/2009 | Tsung | F23D 14/045 |
| | | | 126/39 E |
| 2010/0003626 A1 * | 1/2010 | Schlosser | F24C 3/103 |
| | | | 431/264 |

FOREIGN PATENT DOCUMENTS

WO PCT/US2015/048605 12/2015

\* cited by examiner

*Primary Examiner* — Avinash Savani
(74) *Attorney, Agent, or Firm* — David G. Woodral; Gable Gotwals

(57) ABSTRACT

A burner with a tubular body has a proximal end, a distal end, and a medial portion therebetween and further defining an upper side and a lower side. The burner has a gas orifice on the proximal. A plurality of burner ports open on the top side and span between the medial portion to the distal end. At least one carry over port opens between the top side and bottom side of the body proximal to the plurality of burner ports. At least one transition ports opens on the medial portion of the body between the at least one carry over port and the plurality of burner ports.

18 Claims, 12 Drawing Sheets

TOP PORTED BURNER

CROSS-REFERENCE TO RELATED CASES

This application claims the benefit of U.S. provisional patent application Ser. No. 62/047,453, filed on Sep. 8, 2014, and incorporates such provisional application by reference into this disclosure as if fully set out at this point.

FIELD OF THE INVENTION

This disclosure relates to gas burning appliances in general and, more specifically, to tubular gas burners suitable for use in a cooking apparatus.

BACKGROUND OF THE INVENTION

Gas barbeque grills today are often built with a rectangular firebox containing a plurality of gas burners below a cooking grate. These gas burners are often configured as tubes oriented from front to back and placed alongside each other at intervals and numbering from two to six. The front of each of the burners terminates in a hole facing the front face of the firebox and the rear of each of the burners is sealed off and secured to the rear face of the firebox. Gas may be injected into the burners using this hole. Combusting gas escapes from the burners via side mounted burner ports. Carry over tubes are sometimes provided at the rear of the burners for transferring flame from one to the other. Being rear mounted, the carry over tubes can take advantage of higher stagnant pressure compared to the front of the burner where gas is injected.

The temperature of the materials comprising the burners can be very high, especially in the case of lower BTU rates used for slower cooking times which results in flames wrapping closely around the burner from the side opening burner ports. Burner temperatures in the range of 1000° F. to 1200° F. are not uncommon. Such high temperatures promote the oxidation and corrosion of the burner materials through inducement of micro-fissures and other processes.

Further, a gas grill is normally constructed with a lid that opens around a pivot axis at the rear of the firebox, with an opening for exhaust gases also at the rear. This can result in higher temperatures at the rear of the appliance from normal convection flow. However, the issue is exacerbated by placement of the carry over tube at the rear of the appliance. Hence both the construction of the firebox and the burner promote uneven heating.

What is needed is a system for addressing the above, and related, concerns.

SUMMARY OF THE INVENTION

The invention of the present disclosure, in one aspect thereof, comprises a burner with a tubular body having a proximal end, a distal end, and a medial portion therebetween and further defining an upper side and a lower side. The burner has a gas orifice on the proximal. A plurality of burner ports open on the top side and span between the medial portion to the distal end. At least one carry over port opens between the top side and bottom side of the body proximal to the plurality of burner ports. At least one transition ports opens on the medial portion of the body between the at least one carry over port and the plurality of burner ports.

The burner may further comprise a carry over tube oriented perpendicularly to the tubular body and aligned proximate to the at least one carry over port. The carry over tube may be offset distally from a center of the at least one carry over port. An upper stud may be inserted partially into the tubular body from the upper side and distally from a center of the at least one carry over port. A lower stud may be inserted partially into the tubular body from the lower side and distally from the upper stud. The upper and stud and lower stud may both be located proximally to the plurality of burner ports.

In some embodiments, the tubular body of the burner comprises a front piece and a rear piece, located proximally and distally, respectively, and the front piece is telescopingly received by the rear piece to adjust an overall length of the tubular body. The front piece and rear piece may each provide part of the plurality of burner ports opening on the top side. A lock stud may selectively retain the front piece and rear piece in a fixed position with respect to one another. In some embodiments, the at least one carry over port and the at least one transition port are located exclusively on the front piece.

The invention of the present disclosure, in another aspect thereof, comprises a burner assembly comprising having a first tubular burner body having upper and lower sides, a distal end, a proximal end, and a medial portion. A plurality of top burner ports open on the upper side of the medial portion of the first burner body, at plurality of carry over ports open between the upper and lower sides on the medial portion of the first burner body, proximal to the plurality of top burner ports, and a plurality of transition ports span radially between the plurality of top burner ports and plurality of carry over ports. An upper stud inserted through the upper side into the first burner body proximate the transition ports, and a lower stud inserted through the lower side into the first burner body distally located from the upper stud.

In some embodiments, the upper stud extends at least half way through the burner body from the upper side to the lower side. The lower stud may extend at least halfway through the burner body from the lower side to the upper side.

The burner assembly may further comprise a second burner and a carry over tube connecting the first and second burner. The carry over tube is connected to the first burner perpendicularly thereto and proximate the carry over ports. The carry over tube may comprise a segment of open tubing with a plurality of ports defined therein opening toward the proximal end of the first burner. The carry over tube may provide a lip above the plurality of ports defined therein. The segment of open tubing of the carry over tube may be offset distally from a center of the carry over ports.

The invention of the present disclosure, in another aspect thereof, comprises a burner assembly with a plurality of tubular burners, parallel to one another, and each having a tubular body having upper and lower sides, a distal end, a proximal end, and a medial portion. Top burner ports are defined on the medial portions in the upper side of each of the plurality of tubular burners. Carry over ports are defined between the upper and lower sides of the plurality of burner tubes proximal to the plurality of top burner ports. Transition ports defined between the top burner ports and the carry over ports on the plurality of tubular burners. At least one carry over tube spans perpendicularly between two adjacent ones of the plurality of burners and connects to the two adjacent ones of the plurality of burner tubes distal from a center of the plurality of carry over ports but nearer the proximal ends of the two adjacent ones of the plurality of burners than the distal ends.

Some embodiments include an upper stud in at least one of the two adjacent ones of the plurality of burners located proximate the respective transition ports and distal from a center of the carry over ports. A lower stud may be located distally located from the upper stud.

DETAILED DESCRIPTION OF THE PREFERRED EMBODIMENTS

Figure 1:
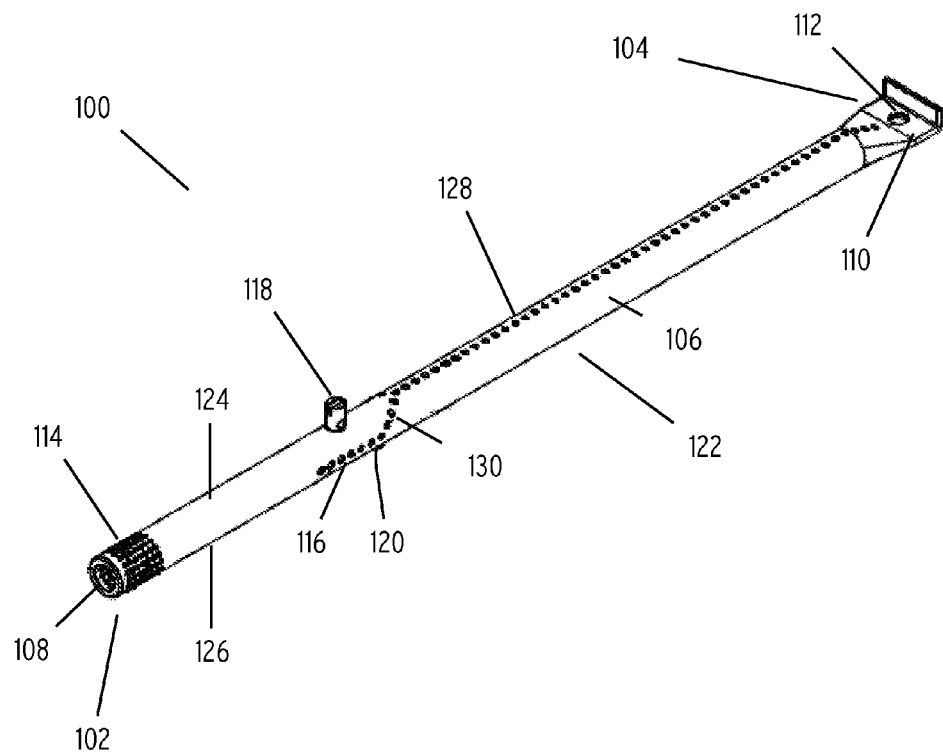
FIG. 1 is a perspective view of a top ported burner according to aspects of the present disclosure.

Referring now to FIG. 1 a top ported burner 100 according to aspects of the present disclosure is shown. The top ported burner 100 is shown in a tubular configuration, round in diameter, but other general shapes may be utilized where appropriate. The top ported burner 100 has a body 122 with a proximal end 102, medial portion 106, and distal end 104. These terms are utilized for the relative position and orientation of the body 122 since, in the present embodiment, the distal end 104 is configured to be placed in firebox of a gas barbecue grill toward the rear or hinged side. The proximal end 102 will be closest to the front of the firebox where the gas controls are typically found. The medial portion 106 may be considered to be anywhere on the body 122 between the proximal end 102 and distal end 104, although component locations may be further specified by their relative position with respect to other components (e.g., a component may be located distally from another component although both may be on the medial portion 106 of the body 122). Length of the body 122 can vary based on application and final installation location. In one embodiment the length is around 15 inches.

Although various diameters of tubing may be employed in constructing the top ported burner 100, the present embodiment utilizes commercially available steel tubing having an outer diameter of about 0.75 inches and an inner diameter of about 0.641 inches. Use of top burner ports 128 in the various embodiments of the present disclosure allows smaller diameter tubing to be utilized versus that required for adequate performance in a side ported burner, which may be on the order of an inch or more in diameter.

Use of top burner ports 128 can also lead to a drastic reduction in temperature of the burner 100. Temperatures of the burner 100 may be from 200° to 300° F. lower with the same BTU/Hr heat input, which helps to improve burner life significantly. Also, a top ported burner helps to have higher turn down ratio of fuel input, and thus consumers can obtain the benefit of optional low temperature cooking.

In the various embodiments of the top ported burner 100, the rotational orientation of the tubular body 122 along its length or axis is important to understanding proper placement and operation. As illustrated, an upper side 124 of the body 122 is generally oriented above a lower side 126. A flat 110 may be provided at the distal end 104 of the body 122 to aid in proper orientation and installation of the top ported burner 100. An opening 112 may be provided on or near the distal end 104 for receiving a fastener, tab, or other means for fixing the proper location of the distal end 104 within the gas grill firebox into which it is installed.

Gas may be provided into the top ported burner 100 via an orifice 108. In a typical consumer gas grill the gas is supplied under pressure of about 0.5 pounds per square inch. Relatively high velocity of gas entering the body 122 of the top ported burner 100 at the orifice 108 causes a low pressure inside the top ported burner 100 near the orifice 108. Consequently air inlet ports 114 may be provided for drawing in air to the top ported burner 100. Air drawn in via the air inlet ports 114 is referred to as primary air. After mixing with the primary air, gas flowing through the body 122 of the top ported burner 100 may have a concentration of about 20% of stoichiometric mixture.

A plurality of top burner ports 128 are arrayed along the upper side 124 of the body 122. The top burner ports 128 may begin along the medial portion 106 of the body 122 (as further explained below) and terminate proximate the distal end 104. The top burner ports 128 are generally oriented at the very top center of the upper side 124. This allows the fuel mixture exiting the top burner ports 128 to mix with air outside the top ported burner 100 (so called secondary air) and burn completely with minimal heating of the body 122 of the top ported burner 100 itself.

A typical barbecue grill may be sized such that a number of burners are needed to provide adequate and even heating. As described, one burner may pass flame to another within the same firebox by means of a carry over tube. However, for effective cross over tube use, carry over ports 116 may be needed. Rather than opening at the top of the upper side 124 of the body 122 like the top burner ports 128, the carry over ports 116 may be oriented to the side of the body 122. In some embodiments, they are offset from the radial orientation of the top burner ports 128 by about 90 degrees.

The carry over ports 116 may also be sized somewhat larger than the top burner ports 128. In one embodiment, the carry over ports 116 have a diameter of about 0.125 inches and a center-to-center spacing of about 0.2 inches, while the top burner ports 128 have a diameter of about 0.089 inches and a center-to-center spacing of about 0.2 inches. The transition ports 130 are approximately sized to match the top burner ports 128 with a diameter of about 0.089 inches and a center-to-center spacing of about 0.2 inches. In the present embodiment, three carry over ports 116 may be provided on each side of the body 122 of the top ported burner 100. Their particular longitudinal location is described in greater detail below but they are generally located proximally (e.g., toward the proximal end 102) to an upper stud 118. Spacing between the most distal of the carry over ports 116 and the most proximal of the transition ports 130 may be about 0.2 inches center-to-center.

In addition to the upper stud 118, which may be threaded or otherwise fastened into the upper side 124 of the body 122, a lower stud 120 may be fastened into the lower side 126 of the body 122, distally from the upper stud 118.

Figure 2:
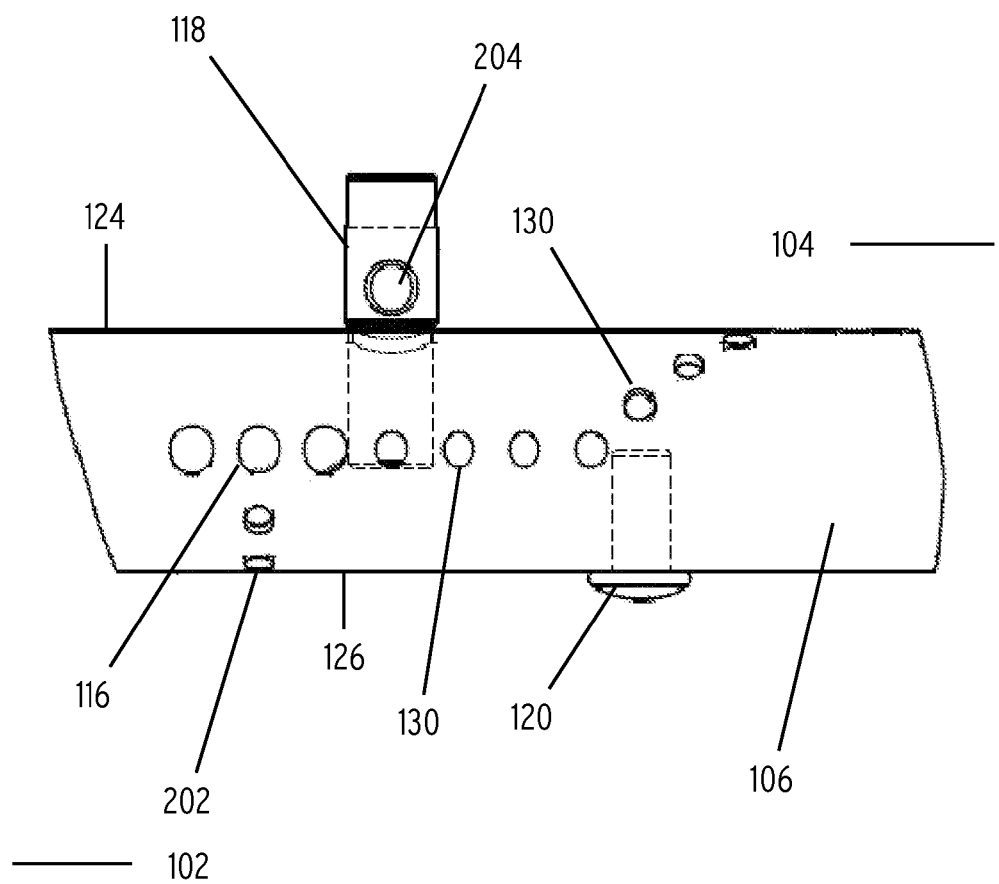
FIG. 2 is a close up side view illustrating a portion of the top ported burner of FIG. 1.

Referring now to FIG. 2, a close up side view of a portion of the top ported burner 100 of FIG. 1 is shown. The view of FIG. 2 concentrates on the medial portion 106 of the body 122 near the upper stud 118 and lower stud 120. The upper stud 118 can be seen located just toward the distal end 104 of the last of the carry over ports 116. For reasons explained below, the upper stud 118 may have an aperture 204 defined in an upper portion thereof. The upper stud 118 pierces the upper side 124 and extends downwardly into the 102 to just over halfway through. In the present embodiment, the bottom of the upper stud 118 can be seen to extend to approximately the bottom level of the first of the transition ports 130. The lower stud 120 pierces the lower side 126 of the body 122 and extends upward to approximately the midline of the body 122. Hence it does not extend so far inward as the upper stud 118, which extends past the midline to the bottom of the transition ports 130.

Longitudinally, the lower stud 120 is placed just past the last of the transition ports 130 that are on a common axial line with the carry over ports 116. In the present embodiment, there is a series of four transition ports 130 that are offset from the upper side 124 by about 90 degrees before the rest gradually shift toward the upper side 124 adjacent to the top burner ports 128 (FIG. 1). In some embodiments, three of the transition ports 130 span between those in line with the carry over ports 116 and the top burner ports 128. The top ported burner 100 may also be provided with a series of igniter ports 202 that may be placed laterally along the lower side 126 below the carry over ports 116. As explained below, these provide outgassing proximate a spark or other ignition source used to light the top ported burner 100. Both sides of the body 122 may have a configuration similar to that shown in FIG. 2.

The diameter or width of upper stud 118 may be between about 5 and 6 millimeters. In fact, an M6 bolt may be utilized for the upper stud 118 with the proper threading tapped into the body 122 of the top ported burner 100. The lower stud 120 may be slightly smaller in diameter, ranging from 3 to 6 millimeters.

As shown in more detail below, the carry over ports 116 are used to provide burning fuel to carry over tubes that allow adjacent burner tubes to be ignited from an active or already ignited burner tube. Because of the lower pressure resultant from the fuel jetting into the orifice 108 (FIG. 1), carry over ports were previously located distally, or at the far end of a burner tube since high static pressure results in these regions by virtue of the slower movement of the pressurized fuel mixture. However, embodiments of the present disclosure are configured to work with carry over tubes that are more proximally located.

In the embodiment illustrated in FIG. 1, the first of the carry over ports 116 is located about 3.95 inches from the orifice 108. Pressure at these ports with a 0.5 PSI injection at the orifice 108 is computed to be about 5 Pascal if the upper stud 118 is not provided. Providing the upper stud 118 as described increases the pressure at the carry over ports 116 to about 25 Pascal, which results in much greater efficacy in transferring flame. However, using only the upper stud 118 can result in unacceptably low pressure on the distal side of the upper stud 118. In the present embodiment, this issue is resolved by placement of the lower stud 120 as described. The disclosed configuration provides for adequate performance and use of the carry over ports 116 while ensuring that all of the top burner ports 128 remain active and supplied with fuel.

Figure 3:
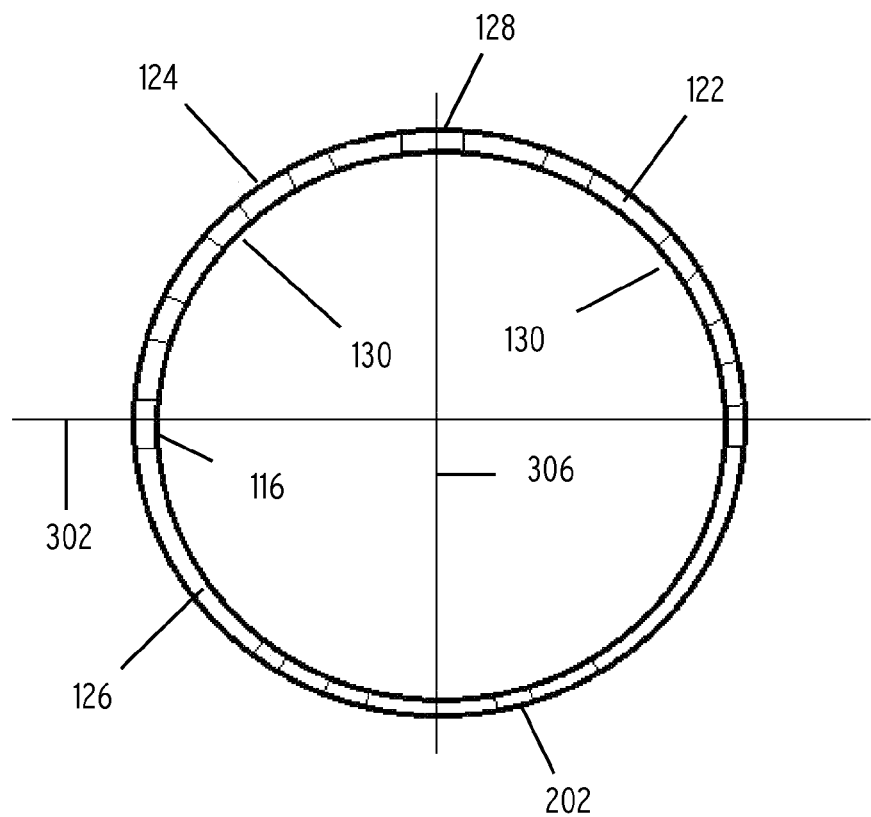
FIG. 3 is a cross sectional cutaway view of a top ported burner according to aspects of the present disclosure.

Referring now to FIG. 3, a cross sectional cutaway view of the top ported burner 100 is shown. FIG. 3 is simplified for illustrative purposes and various ports are not drawn to scale so the relative position of each may be appreciated. The top burner ports 128 are placed near or substantially near the top center of the upper side 124 of the body 122. A vertical line 306 (for reference only) centered upon the cross section of body 122 thus bifurcates the top burner ports 128.

A horizontal line 302 (for reference only) is also centered on the cross section of the body 122, dividing the upper side 124 from the lower side 126. The carry over ports 116 may be said to be between the upper side 124 and lower side 126 and might therefor be bifurcated by horizontal line 302. It is understood that a portion of the carry over ports 116 may thus be on either side of the horizontal line 302 and therefore be partially in the upper side 124 and partially in the lower side 126. In some embodiments, the carry over ports 116 may be skewed more toward the upper side 124 or the lower side 126 but may generally be configured to face more laterally than up or down to be effective at providing a useful carry over flame.

The transition ports 130 can be seen to span the radius of the body 122 between the carry over ports 116 and the top burner ports 128 (the radii on either side of the body 122 between the vertical line 306 and the horizontal line 302). Thus the transition ports 130 are effective at transferring flame from the carry over ports 116 to the top burner ports 128. In the end-on viewpoint of FIG. 3 the transition ports 130 are seen along a radius but they may also be considered to traverse a diagonal when view (for example) from the side point of view of FIG. 2).

Figure 4:
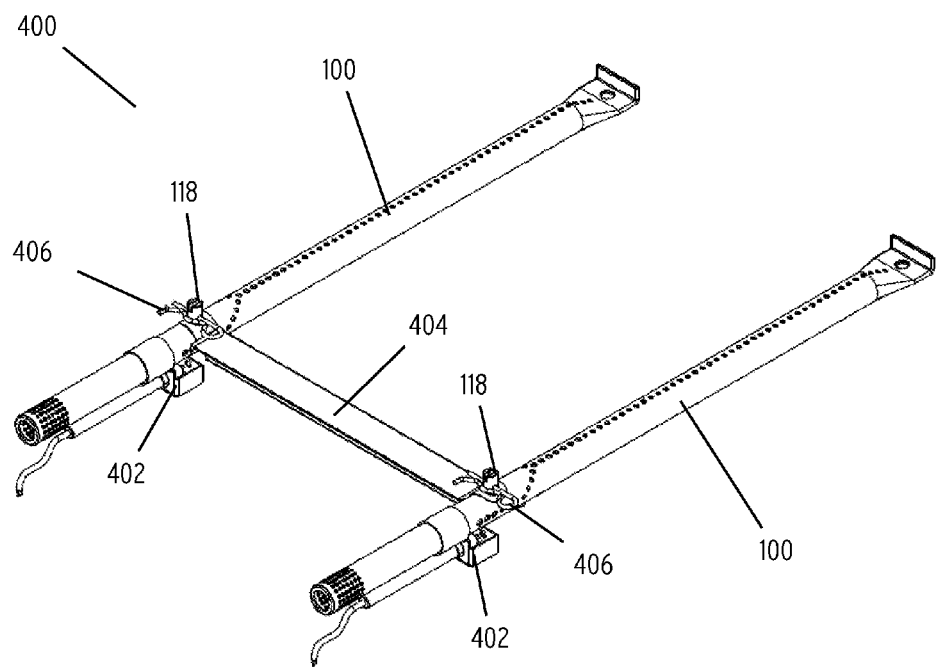
FIG. 4 is a perspective view of a top ported burner assembly according to aspects of the present disclosure.

Referring now to FIG. 4, a top ported burner assembly 400 according to aspects of the present disclosure is shown. The burner assembly 400 comprises two top ported burner 100 functionally linked by a carry over tube 404. The carry over tube 404 may be retained in its proper location with respect to the top ported burner 100 by sliding onto the upper stud 118 of each of the top ported burner 100 and being affixed by a pin 406. In other embodiments, the carry over tube 404 might be spot welded or bolted to each top ported burner 100.

The present embodiment of burner assembly 400 comprises two top ported burners 100 but other embodiments might provide more top ported burners 100 in the same assembly suitably linked by additional carry over tubes 404. The carry over tube 404 is described as being functionally linked to each top ported burner 100 since either of these are capable of providing flame into the carry over tubes 404 for passing to the adjacent top ported burner 100.

In the present embodiment, each top ported burner 100 is equipped with an igniter 402 that provides a spark proximate the igniter ports 202 of the respective top ported burner 100. The igniter 402 may be a battery powered igniter, a piezoelectric ignitor, or have another power source for providing a spark or other means of igniting a gas mixture produced outside the respective top ported burner 100 by the igniter ports 202.

The entire burner assembly 400 may be fitted into a barbecue grill firebox such that the igniters 402 are proximally located within the firebox (e.g., toward the front, or control, side). A cooking surface such as a grate or griddle may be placed above the burner assembly 400. In some embodiments, various implements effective at converting convection heat to infrared for cooking may also be used.

Figure 5:
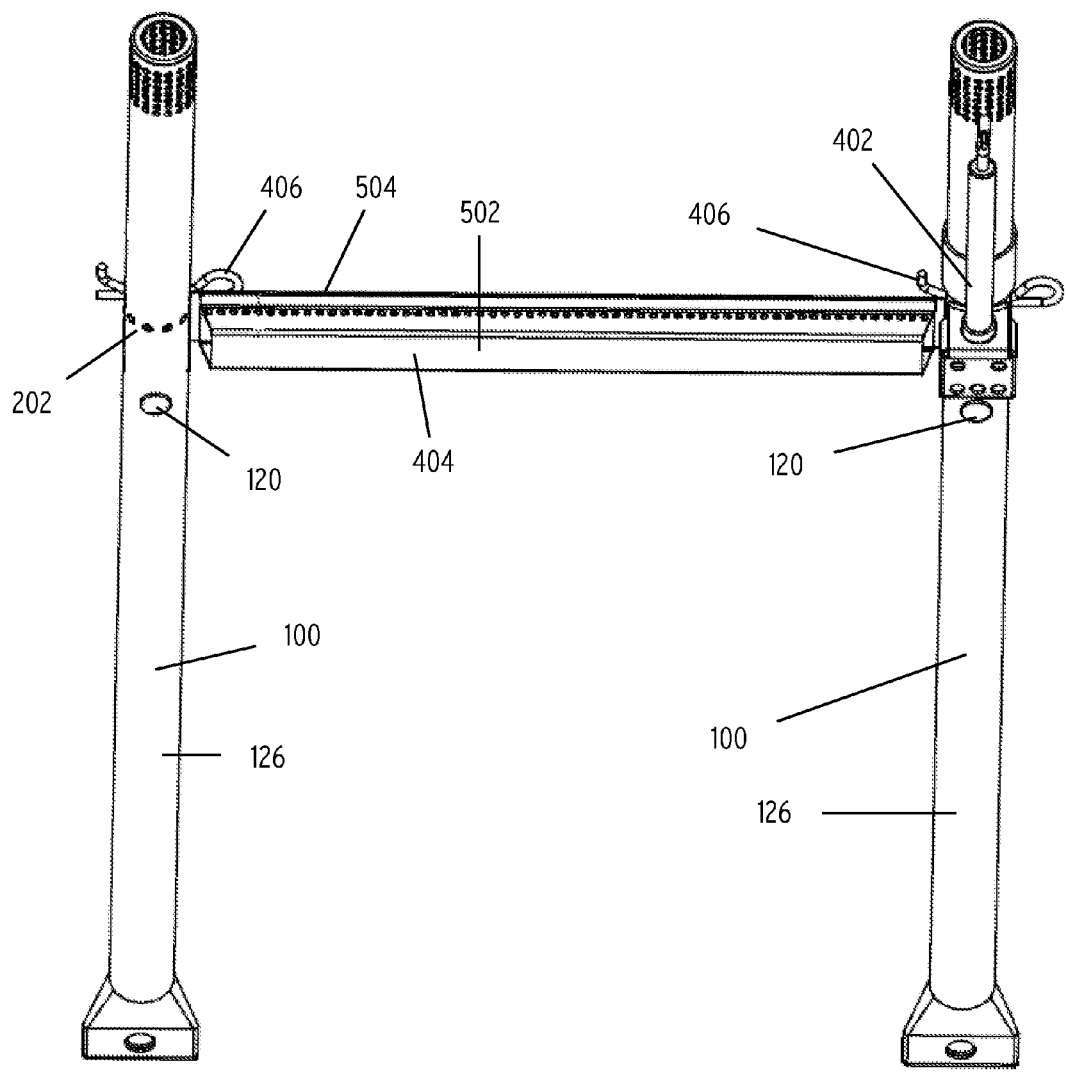
FIG. 5 is an inferior perspective view of the burner assembly of FIG. 4.

Referring now to FIG. 5, an inferior perspective view of the burner assembly 400 of FIG. 4 is shown. Here, the burner assembly 400 is shown with a single igniter 402. The location of the igniter ports 202 above the igniter 402 can thus be appreciated. The carry over tube 404 can be seen to comprise a section of open tubing 502 suspended below a bar 504 spanning between the top ported burners 100. In the present embodiment, the open tubing 502 is rectilinear in cross section. However, in other embodiments, the open tubing 502 may be round in cross section, or have other cross sectional shapes. In one embodiment, the open tubing 502 may be about 6 inches in length between the adjacent top ported burners 100.

Figure 6:
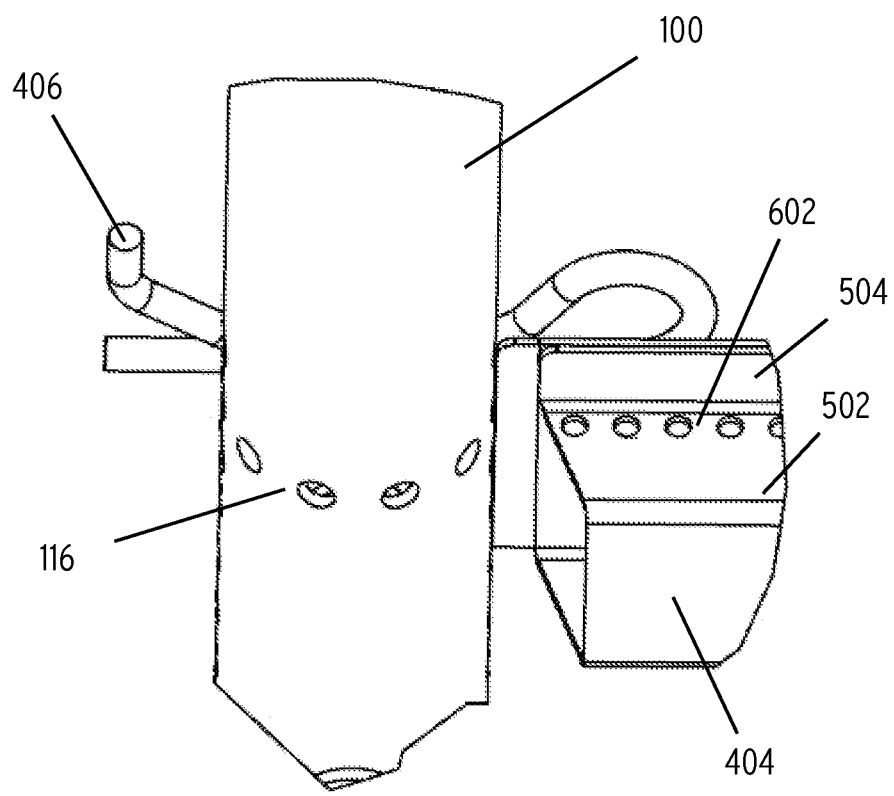
FIG. 6 is an inferior perspective close-up view of the burner assembly of FIG. 4 near the conjunction of the burner and carry over tube.

Referring now to FIG. 6 an inferior perspective close-up view of the burner assembly 400 of FIG. 4 near the conjunction of the top ported burner 100 and carry over tube 404 is shown. Here the left most top ported burner 100 is shown without the igniter 402. The carry over tube 404 comprises a segment of square tubing that spans the distance between adjacent top ported burners 100, with some room for escaping flames to breathe and pass from the carry over ports 116 (FIG. 1) and into the carry over tube 404. To work properly for flame transfer, the carry over tube 404 is provided with a plurality of ports 602 on the proximal side thereof (e.g., toward the carry over ports 116). In some embodiments, the ports 602 are about 0.03 inches in diameter with center-to-center spacing of about 0.06 inches. Although a series of round ports are illustrated and provided as an example, it has also been determined that long thin opening of about 0.040 inches may take the place of the ports 602 but at the expense of more a more complicated manufacturing process.

Figure 7:
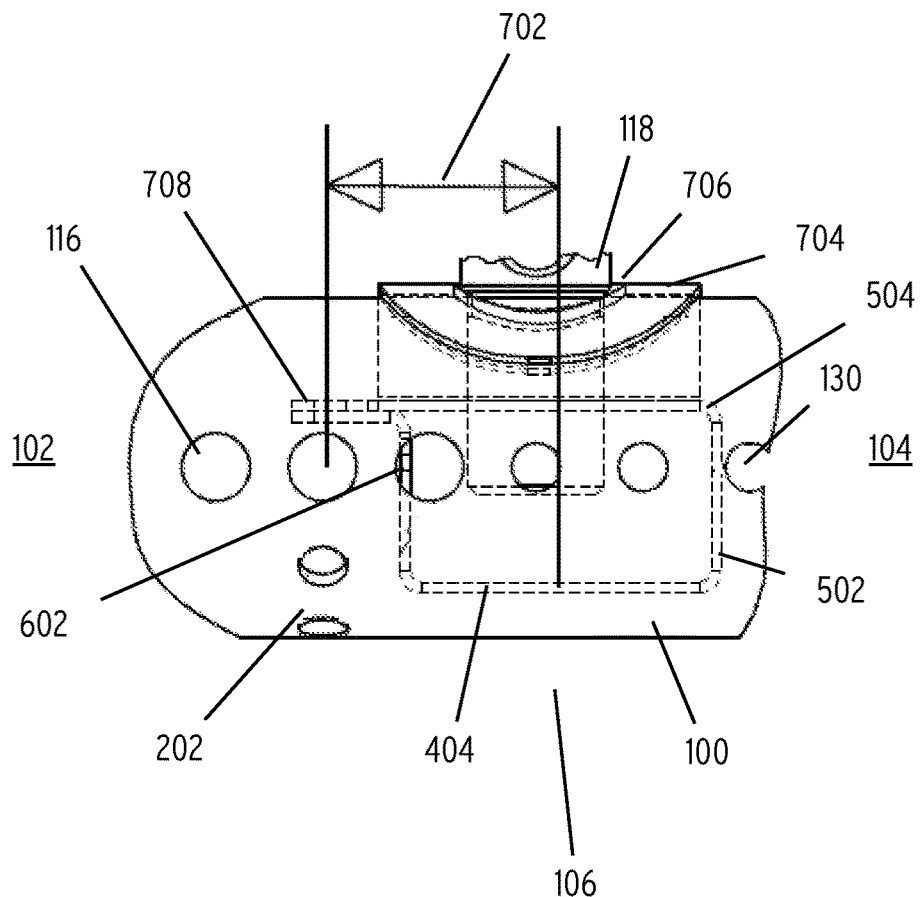
FIG. 7 is a side close-up view of placement of a carry over tube relative to a top ported burner according to aspects of the present disclosure.

Referring now to FIG. 7 a side close-up view of placement of the carry over tube 404 relative to a top ported burner 100 according to aspects of the present disclosure is shown. The side view of FIG. 7 is be from outside the left side of burner assembly 400 (e.g., if facing the burner assembly 400 closet to the proximal side). The bar 504 may provide a shoulder 704, which may be contoured to fit the tubular shape of the body 122 of the top ported burner 100. An aperture 706 may be defined in the shoulder 704 for receiving the upper stud 118 to properly locate the carry over tube 404 relative to the top ported burner 100.

From the end-on perspective of the carry over tube 404 provided in FIG. 7, it can be appreciated that a portion of the bar 504 may overhang the ports 602, which are visible in profile behind the most distally located of the carry over ports 116. Gas escaping from the carry over ports 116 possesses a distal velocity and so does not escape from the carry over ports 116 exactly orthogonal to the ports but tends to escape an angle toward the distal end 104. Accordingly, the carry over tube 404 may be most effective if it has an offset 702 relative to the center of the carry over ports 116. In the present embodiment, such offset 702 is measured from the center of the open tubing 502 to the center of the plurality of carry over ports 116. In the present embodiment, the offset 702 is about 0.22 inches.

Depending upon the offset 702, the open tubing 502 of the carry over tube 404 may actually be more aligned with the transition ports 130 than the carry over ports 116. However, given that the carry over ports 116 do not eject gas at a straight right angle, and the transition ports 130 are sized more to provide transition of flame from the igniter ports 202 and the carry over ports 116 to the top burner ports 128, flame travelling down the carry over tube 404 is still substantially provided by the carry over ports 116.

It will also be appreciated that the open tubing 502 may not be precisely centered with respect to the bar 504. In some cases, the offset 702 produces a lip 708 covering or shielding the ports 602 from above. This lip 708 may enhance the flame transfer characteristics of the carry over tube 404. The open tubing 502, the bar 504, and possibly the lip 708 may actually be formed from a single piece of steel bent into the appropriate shape and possibly spot welded onto itself.

Figure 12:
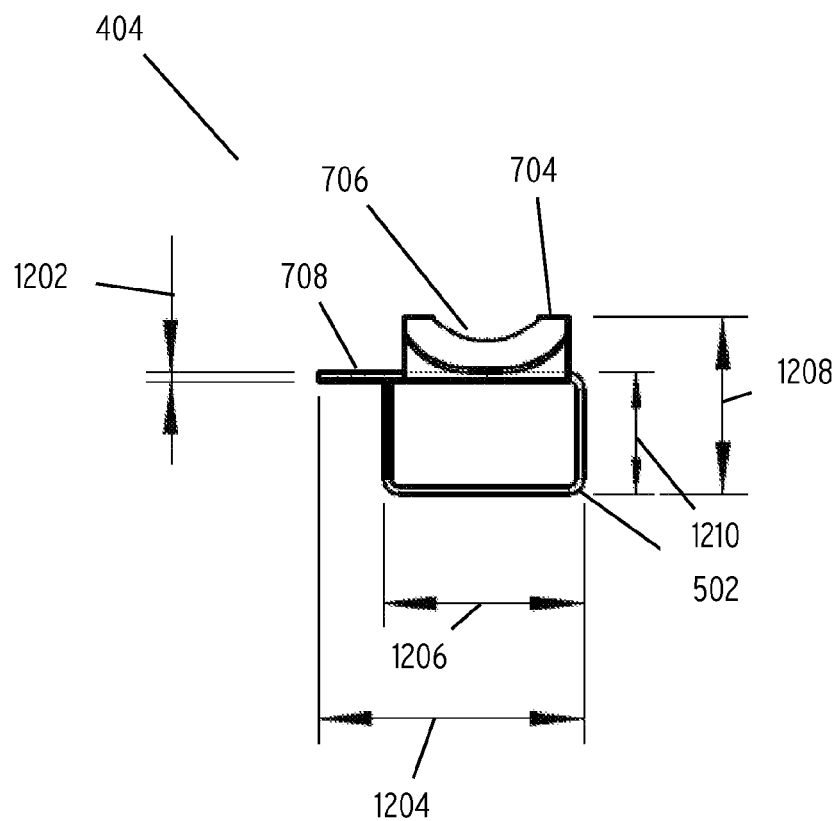
FIG. 12 is an end view of a carry over tube according to aspects of the present disclosure.

Referring now to FIG. 12, an end view illustration of the carry over tube 404 according to aspects of the present disclosure is shown. Here the carry over tube 404 is shown apart from the associated top ported burner 100 for clarity. Dimensions given here in are exemplary only and not intended to be limiting. The carry over tube 404 of FIG. 12 may have a wall thickness 1202 of about 0.024 inches. The carry over tube 404 may have a carry over tube width 1204 of about 0.791 inches and an open tubing width 1206 of about 0.598 inches (outside dimensions). A carry over tube height 1208 may be about 0.531 inches and an open tubing width 1206 may be about 0.362 inches (outside dimensions). These dimensions result in a width for the lip 708 of about 0.193 inches.

Figure 8:
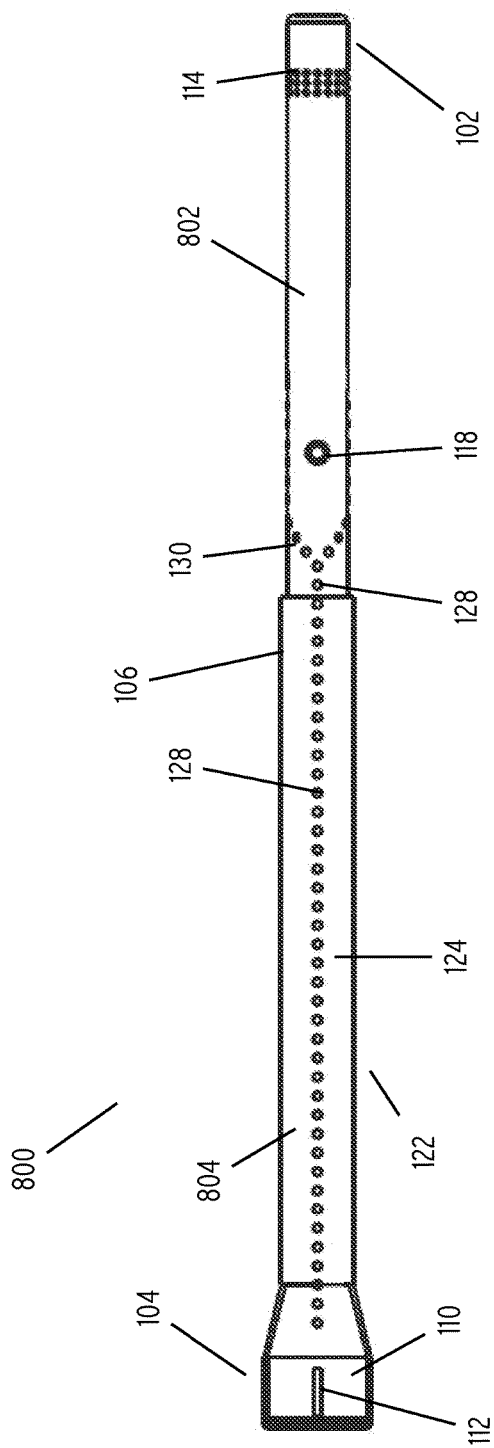
FIG. 8 is a top view of an adjustable top ported burner according to aspects of the present disclosure.

Referring now to FIG. 8, a top view of an adjustable top ported burner 800 according to aspects of the present disclosure is shown. The adjustable top ported burner 800 shares many components with the top ported burner 100 previously described. Those components are numbered accordingly for ease of reference. The body 122 of the adjustable top ported burner 800 is separated into front piece 802 and rear piece 804. These two components are arranged telescopically such that the front piece 802 slides into and out of the rear piece 804. The overall range of adjustment of the length of the burner 800 may be dependent upon the desired dimensions of the burner assembly or firebox in which the burner 800 is utilized. In one embodiment, the length adjusts from about 15 inches to over 20 inches.

The front piece 802 contains those components discussed with respect to the proximal end 102, such as the air inlet ports 114. The rear piece 804 contains those components discussed with respect to the distal end 104, such as the flat 110 and opening 112. The opening 112 is shown here as a slotted opening to aid in affixing the distal end 104 to the back of the firebox or other location associated with the back of the barbecue grill.

The front piece 802 and rear piece 804 slide together near the medial portion 106 of the body 122. Both the front piece 802 and rear piece 804 provide a plurality of top burner ports 128 and, as explained further below the two pieces may be aligned such that the respective top burner ports 128 of each piece are aligned keeping all of the top burner ports 128 functional. In the present embodiment, the front piece 802 contains the transition ports 130 and the other components toward the proximal end 102 from the transition ports 130 such as the carry over ports 116 and the igniter ports 202. Moreover the front piece 802 and the rear piece 804 are constructed and sized such that even in the most collapsed position (e.g., front piece 802 fully inserted into rear piece 804) the transition ports 130 and the components and structures located proximal to the transition ports will remain open and operational.

In the present embodiment, the front piece 802 comprises tubing with an outer diameter of about 0.625 inches and an inner diameter of about 0.440 inches. The rear piece 804 comprises tubing with an outer diameter of about 0.75 inches and an inner diameter of about 0.641 inches. It will be appreciated that the dimensions of the front piece 802 and rear piece 804 could be inverted such that the front piece 802 fits over the rear piece 804. However, nesting the front piece 802 inside the rear piece 804 takes advantage of the natural distal flow of the gas mixture. As with the top ported burner 100 the tubing comprising the body 122, here the front piece 802 and rear piece 804, can be made of various sizes and does not generally have to be as large as tubing utilized for side ported burners, which may be on the order of one inch in diameter or more.

Figure 9:
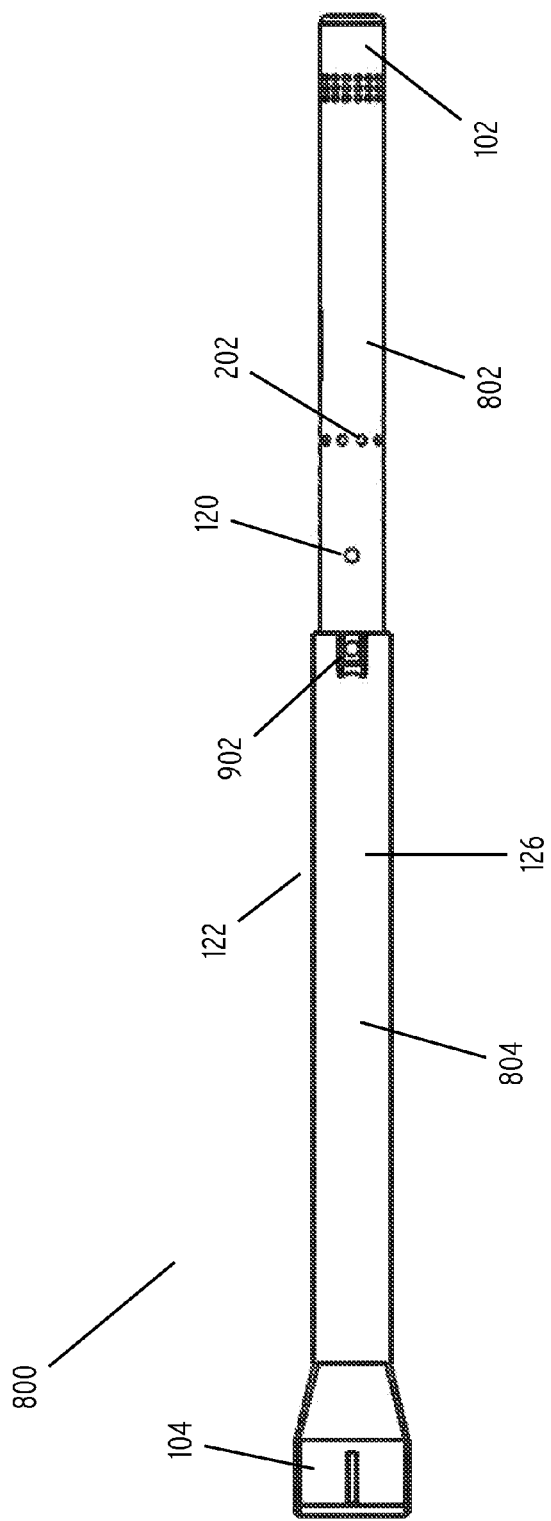
FIG. 9 is a bottom view of an adjustable top ported burner according to aspects of the present disclosure.

Referring now to FIG. 9, a bottom view of the adjustable top ported burner 800 is shown. FIG. 9 shows that the lower side 126 of the body 122, on the rear piece 804, provides a lock stud 902. The lock stud 902 may be a screw or bolt threadingly inserted into an opening on the lower side 126 of the body 122 on the rear piece 804. The lock stud 902 may be tightened to engage against the front piece 802 and retain it in place. Either with the lock stud 902 loosened, or with the lock stud 902 removed, the front piece 802 and rear piece 804 may be slid together or apart to adjust for total length of the adjustable top ported burner 800. Care can be taken to properly align the top burner ports 128 where the front piece 802 and rear piece 804 overlap and the lock stud 902 is then tightened into position.

Figure 10:
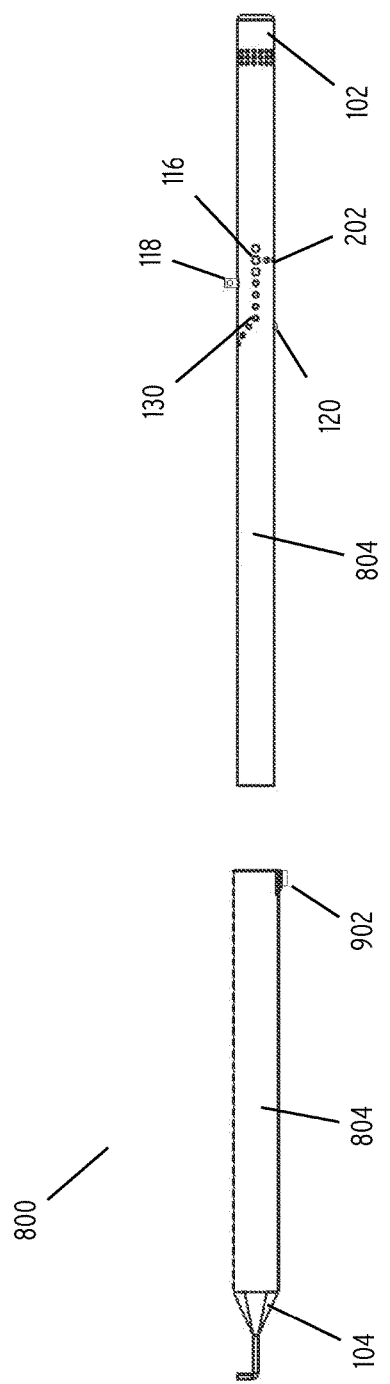
FIG. 10 is a side view of an adjustable top ported burner according to aspects of the present disclosure.

Referring now to FIG. 10, a side view of the adjustable top ported burner 800 is shown. Here the front piece 802 and rear piece 804 are shown completely separated. It can also be seen that the rear piece 804 provides the full set of transition ports 130 and carry over ports 116. Thus, a plurality of adjustable top ported burners 800 can be combined into a burner assembly (similar to burner assembly 400 of FIG. 4) and lit flame shared between them via the carry over tube 404.

Figure 11:
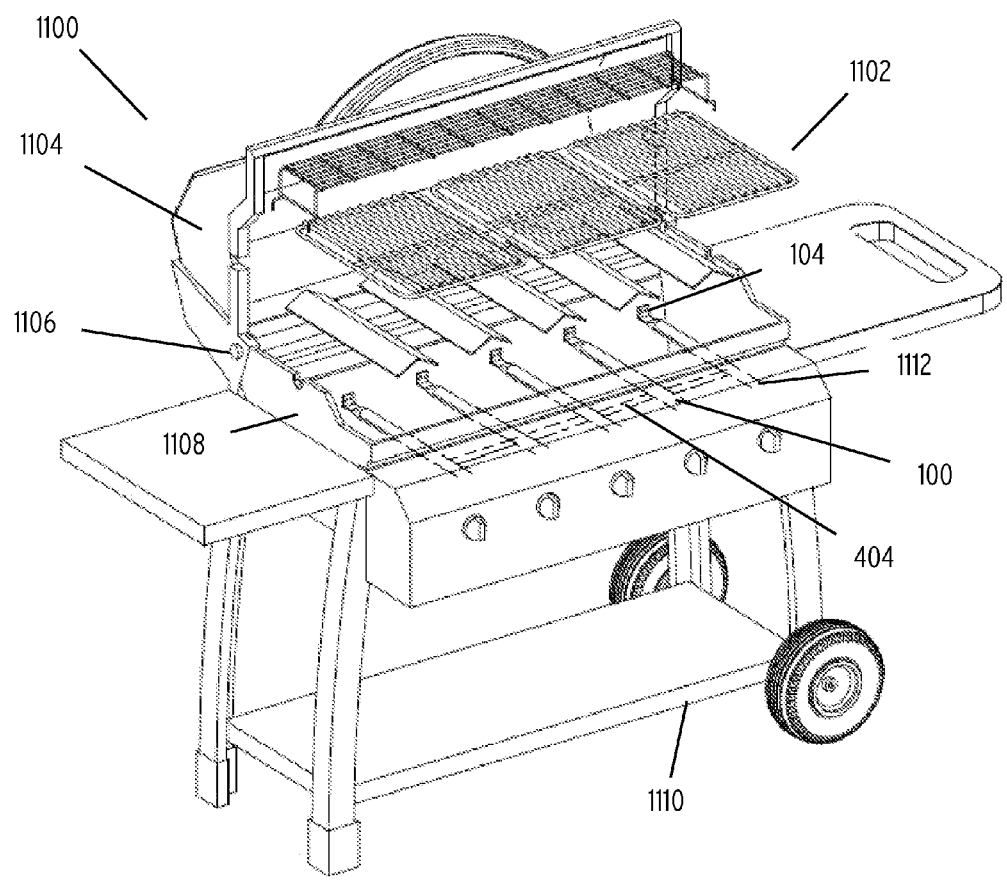
FIG. 11 is a perspective view of a barbecue grill utilizing a burner assembly according to aspects of the present disclosure.

Referring now to FIG. 11, a perspective view of a barbecue grill 1100 utilizing a burner assembly 1112 of the present disclosure is shown. The burner assembly 1112 is similar to the burner assembly 400 (FIG. 4), but utilizes a greater number of top ported burners 100 and carry over tubes 404.

The burner assembly 1112 is shown placed operationally in a barbecue grill 1100. The barbecue grill 1100 has a fire box 1102 comprising a hinged lid 1104 mounted to a tub 1108 via hinges 1106 placed at the back (or distal side) of the fire box 1102. The proximal side is the side from which the user opens and closes the hinged lid 1104, operates gas an ignition controls, etc. The barbecue grill 1100 may also comprise various grates, vaporizer bars, shelves, and/or other components. The barbecue grill 1100 may include a gas canister (not shown) or may connect to permanent gas supply. The fire box 1102 may be mounted to a cart of stand 1110. In other embodiments, it may be permanently placed (e.g., as in an outdoor kitchen).

The top ported burner 100 comprising the burner assembly 1112 may be affixed at distal end 104 to the distal side or rear side of the tub 1108, or appropriately retained in the tub 1108 via other mechanisms. Here it can be seen that the carry over tube 404 are located proximally within the fire box 1102. In the past, carry over tubes have been located distally to take advantage of high stagnation pressure in the rear of burners since the injection of gas near the front leads to low pressure. However, the front-to-rear venting of most barbecue grills results in higher temperatures in the back, which are only exacerbated by rearward placement of the carry over tube. The instant placement of the carry over tube 404 in a forward or proximal position made possible as described herein, results in more even heating for cooking.

It should be understood that where adjustment is needed, or where a single length of burner tube is desired to fit a number of fireboxes, adjustable top ported burners 800 may be used rather than the illustrated top ported burner 100.

It should also be understood that, although the various embodiments of the present disclosure have been described in terms of their function within a barbecue grill, they might also find use in other applications such as broiler, heaters, and the like.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A burner comprising:
   a tubular body having a proximal end, a distal end, and a medial portion therebetween and further defining an upper side and a lower side;
   a gas orifice on the proximal end; a plurality of burner ports opening on the top side and spanning between the medial portion to the distal end;
   at least one carry over port opening between the top side and bottom side of the body proximal to the plurality of burner ports;
   at least one transition ports opening on the medial portion of the body between the at least one carry over port and the plurality of burner ports; and
   a carry over tube oriented perpendicularly to the tubular body and aligned proximate to the at least one carry over port;
   wherein the carry over tube is offset distally from a center of the at least one carry over port and spaced apart from the tubular body to capture escaping flames from the at least one carry over port.

2. The burner of claim 1, further comprising an upper stud inserted partially into the tubular body from the upper side and distally from a center of the at least one carry over port.

3. The burner of claim 2, further comprising a lower stud inserted partially into the tubular body from the lower side and distally from the upper stud.

4. The burner of claim 3, wherein the upper and stud and lower stud are both located proximally to the plurality of burner ports.

5. The burner of claim 1, wherein the tubular body comprises a front piece and a rear piece, located proximally and distally, respectively, and the front piece is telescopingly received by the rear piece to adjust an overall length of the tubular body.

6. The burner of claim 5, wherein the front piece and rear piece each provide part of the plurality of burner ports opening on the top side.

7. The burner of claim 5, further comprising a lock stud selectively retaining the front piece and rear piece in a fixed position with respect to one another.

8. The burner of claim 5, wherein the at least one carry over port and the at least one transition port are located exclusively on the front piece.

9. A burner assembly comprising:
   a first tubular burner body having upper and lower sides, a distal end, a proximal end, and a medial portion; a plurality of top burner ports opening on the upper side of the medial portion of the first burner body;
   at plurality of carry over ports opening between the upper and lower sides on the medial portion of the first burner body, proximal to the plurality of top burner ports;
   a plurality of transition ports spanning radially between the plurality of top burner ports and plurality of carry over ports;
   an upper stud inserted through the upper side into the first burner body proximate the transition ports; and
   a lower stud inserted through the lower side into the first burner body distally located from the upper stud.

10. The burner assembly of claim 9, wherein the upper stud extends at least half way through the burner body from the upper side to the lower side.

11. The burner assembly of claim 9, wherein the lower stud extends at least halfway through the burner body from the lower side to the upper side.

12. The burner assembly of claim 9, further comprising: a second burner; a carry over tube connecting the first and second burner; wherein the carry over tube is connected to the first burner perpendicularly thereto and proximate the carry over ports.

13. The burner assembly of claim 12, wherein the carry over tube comprises a segment of open tubing with a plurality of ports defined therein opening toward the proximal end of the first burner.

14. The burner assembly of claim 13, wherein the carry over tube comprises a lip above the plurality of ports defined therein.

15. The burner assembly of claim 13, wherein the segment of open tubing of the carry over tube is offset distally from a center of the carry over ports.

16. A burner assembly comprising:
   a plurality of tubular burners, parallel to one another, and each having a tubular body having upper and lower sides, a distal end, a proximal end, and a medial portion, the proximal ends each having an orifice for admitting gas;
   top burner ports defined on the medial portions in the upper side of each of the plurality of tubular burners;
   carry over ports defined between the upper and lower sides of the plurality of burner tubes proximal to the plurality of top burner ports;
   transition ports defined between the top burner ports and the carry over ports on the plurality of tubular burners;
   at least one carry over tube spanning perpendicularly between two adjacent ones of the plurality of burners and connecting to the two adjacent ones of the plurality of burner tubes distal from a center of the plurality of carry over ports but nearer the proximal ends of the two adjacent ones of the plurality of burners than the distal ends.

17. The burner assembly of claim 16, further comprising an upper stud in at least one of the two adjacent ones of the plurality of burners located proximate the respective transition ports and distal from a center of the carry over ports.

18. The burner assembly of claim 17, further comprising a lower stud distally located from the upper stud.

\* \* \* \* \*